Patented Nov. 25, 1930

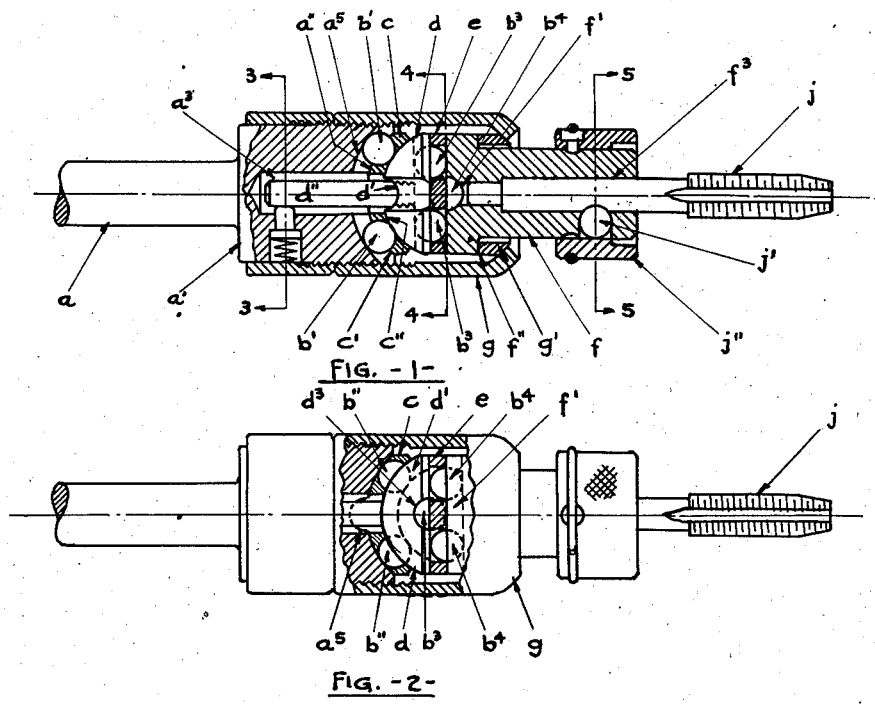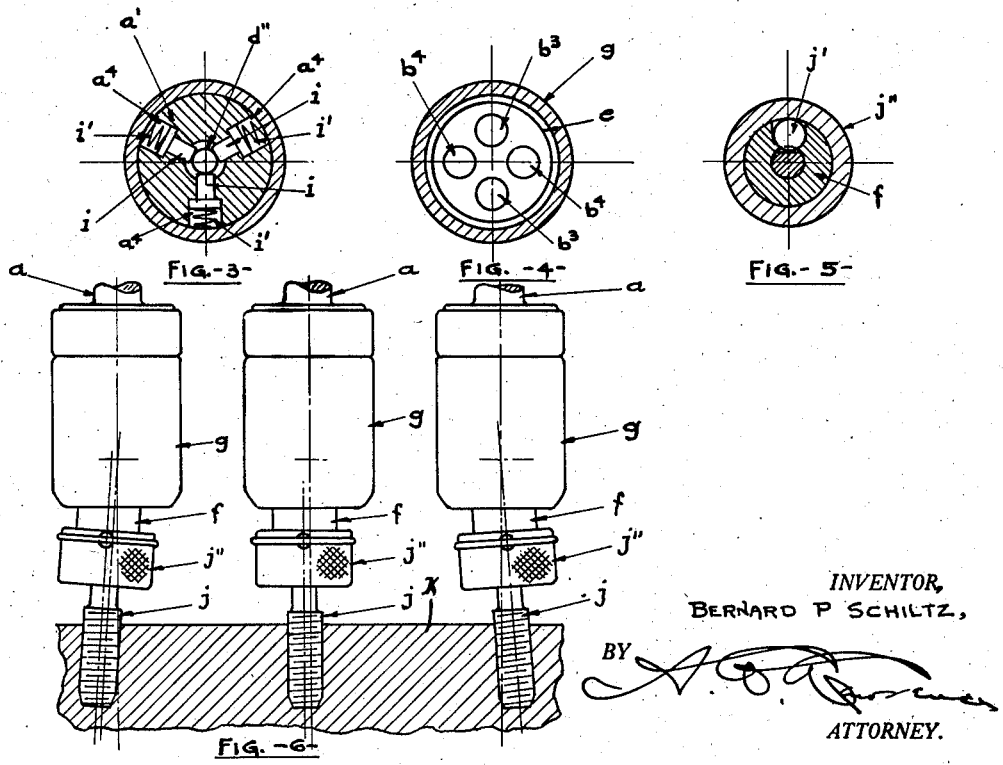

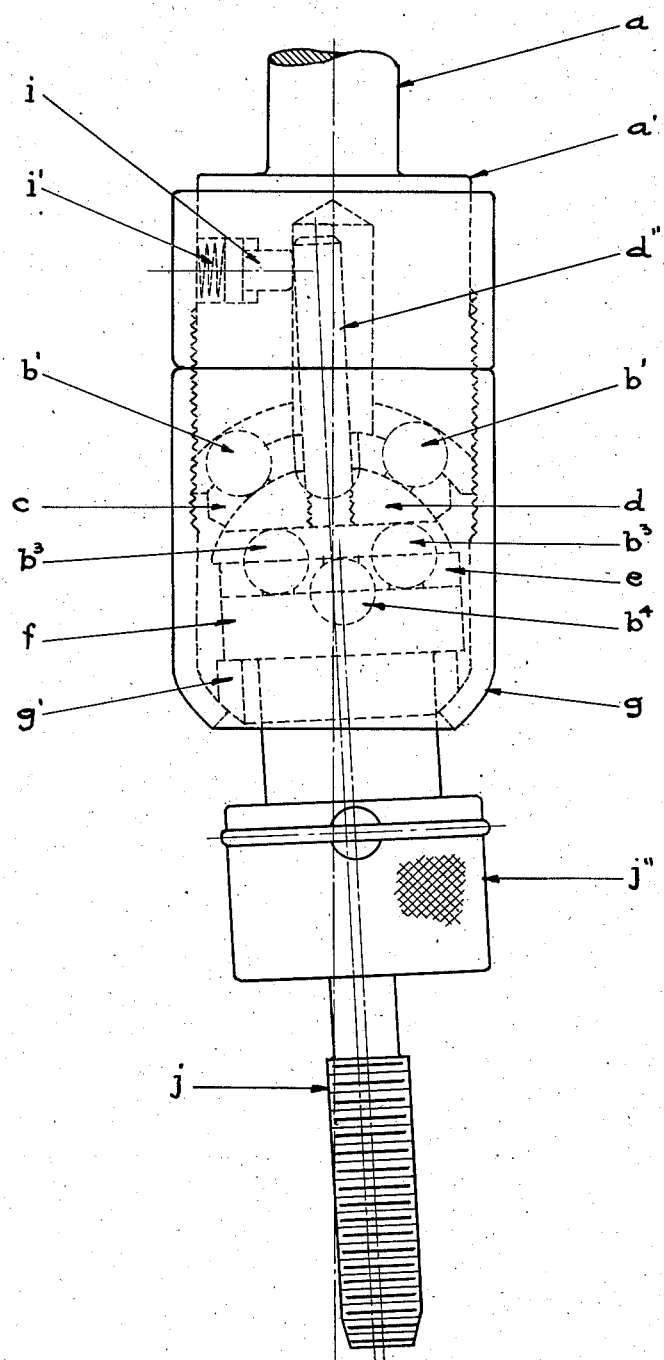
Fig.-7-

1,782,633

UNITED STATES PATENT OFFICE

BERNARD P. SCHILTZ, OF CLEVELAND, OHIO

FLEXIBLE DRIVING CONNECTION FOR TOOL HOLDERS

Application filed April 27, 1926. Serial No. 104,902.

My invention relates to improvements in flexible driving connection for tool holders especially adapted for actuating taps, drills, and the like, and has for its object the provision of rotating or driving means whereby the rotated member, reamer, or tap shall be afforded a considerable range of automatic accommodation to the particular work in hand. The requirements involve the provision of a compact driving connection having a wide range of adaptation and use, consisting of parts essentially simple in construction, while affording long wearing qualities. The desired flexibility, moreover, does not admit of loose connections or lost motion, and the flexible driving connection must be one adapted for use by the average mechanic. Having these qualities and requirements in mind, I have developed the compact, simple and relatively inexpensive driving connection hereinafter described in detail and shown in the accompanying drawings, wherein:

Figure 1 is a longitudinal sectional view of my improved flexible driving connection;

Fig. 2 is a view thereof in elevation, broken away midway and in section, in order to illustrate the flexible driving members;

Fig. 3 is a transverse section on line 3—3, Fig. 1;

Fig. 4 is another section on line 4—4, Fig. 1;

Fig. 5 is a section through the chuck on line 5—5, Fig. 1, and

Fig. 6 is a fragmentary view of a multiple-spindle tapping mechanism employing three of my improved driving connections in exaggerated showing of various capacities for adaptation to the conditions of the work being done. Fig. 7 is a large assembly view.

Throughout the several figures of the drawings I have employed the same character of reference to indicate similar parts.

It will be understood that the broken away shank $a$ is connected with a power-drive for rotation of my improved connection and any inserted tool. This shank has an integral threaded block $a'$ presenting a hollowed spherical face $a''$. It is axially bored at $a^3$ and radially bored at $a^4$, (Fig. 3), three openings of two diameters each being provided at 120° displacement.

As connecting means for the members of my flexible driving connection, there are provided two sets of steel balls, each divided into groups of two, as $b'$—$b''$, and $b^3$—$b^4$; the groups being disposed in four adjacent planes, as indicated in Figs. 1 and 2, of which the sectioned portions are respectively at right angles. A ball cage $c$ having concave and convex faces $c'$ $c''$, is adapted to accommodate the first set of steel balls $b'$ $b''$, the groups thereof being disposed in diametrically arranged openings so that the first group $b'$ will extend within the diametrical groove $a^5$ provided in the bottom face of block $a'$. The second group of balls $b''$, in turn, extend within the groove $d'$ of a spherical faced member $d$ having a centering opposing extension $d''$ extending within the bore $a^3$ beyond the connecting means. It will be observed that the respective concave and convex faces of these engaging members $a'$, $c$ and $d$ have the same curvature so that they will fit closely together and afford free relative concentric movement, except as restricted by the overlapping or entering bodies of the steel balls. These assembled members form essentially a ball and socket driving connection.

The bottom of member $d$ is plane-faced and is provided with a diametrical groove $d^3$ at right angles to $d'$, wherein the first group $b^3$ of the second set of balls extend, being maintained in position by the disc-like ball cage $e$ interposed between the members $d$ and $f$. Within the openings provided in cage $e$, the other group of balls $b^4$ are positioned to extend within the diametrical groove $f'$ provided upon the inner face of member $f$. The latter is shouldered at $f''$ to accommodate the spacing ring $g'$ beveled at its lower edge and all of the driving connections are assembled in operative relation by means of the enclosing casing $g$ which screws upon the exteriorly threaded block $a'$.

As best indicated in Fig. 3, the centering stem $d''$ of member $d$ is engaged by the three studs $i$, tensioned by their respective springs $i'$, normaly to maintain said stem and the associated members of the driving connection in axial alinement with the shank $a$. This is the normal driving position wherein the special features of my flexible mounting are afforded no unusual function beyond driving the inserted tap $j$, held within the socket $f^3$ by means of the ball $j'$ and its coacting ring $j''$. The resilient centering or alining means, however, afford the important function of accurately presenting the tool or group of tools to the work, as particularly demanded with automatically operated machines.

From a consideration of the structural features of the driving parts, however, it will be appreciated that the several members respectively have sufficient play upon one another in their assembled casing so that both lateral and axial displacement of the tap or inserted tool and its angular movement are readily obtainable without affecting its driving relation in any way.

Referring particularly to Fig. 7, it will be seen that the upper set of balls and their associated interconnected members afford a wide angular displacement of the tap with respect to the axis of its driving shank. Of course, the connecting parts are well oiled and these play upon one another while rigidly connected for rotation by the balls, so that the tap may be driven at an angle to conform with faulty working conditions, without danger of damage to the parts. In effect, the upper set of balls and associated elements provide a universal joint, compensating for a material angular displacement of the tap; having also the functions of a ball-bearing. One advantageous employment of this feature or capacity of my improved device is indicated in Fig. 6, illustrating the use of three flexible driving connections in a multiple-spindle tapping mechanism. The two outer taps are shown to be operating in holes drilled in the work $k$ at different angles. The middle spindle is shown to be operated upon a hole that is laterally displaced to the left with respect to the regular spacing of the openings to be tapped. This irregularity, however, is compensated for by the lower set of balls and their driving connections, which permit the offset rotation of the tap with respect to the axis of the driving shank. Of course, these illustrations are not intended to represent working conditions, but their exaggeration will serve to make clear the functions and advantages of my instant improvement.

Although I have employed the multiple-spindle tapping mechanism just explained and shown in a fragmentary way in the drawings, it should be understood that my invention is not restricted to the particular mechanism, taps, or other devices explained herein by way of illustration. My invention, instead, relates to and comprises a flexible driving mechanism having the capacity for rotating an associated element in offset relation or in angular axial relation, or both, to the end that mechanical irregularities in the work are compensated or automatically accommodated in accordance with the principles indicated above.

The provision of two associated sets of balls, which within the apertured or socketed openings of the respective ball cages afford co-acting universal joint connections, likewise affords a substantially frictionless automatic adjustment of the several parts. This is of importance for the reason that the tap, reamer, or other tool must operate under considerable downward pressure and torque, so that the ready adjustment of the several members is practically an essential requirement herein.

It will be seen that either set of the ball and socket members of my improved driving connection may be brought independently into action according to the conditions of the work being done. Thus, the upper universal joint permits the free angular adjustment of the tool, within certain limits, while the lower ball and socket connection permits the tool to "float" or accommodate mere axial displacement, also within certain workable limits. All this is accomplished, because of the ball and socket connection of the driving members, without appreciable wear or friction.

Having now described the preferred embodiment of my invention, I claim as new and desire to secure by Letters Patent, the following:

1. In a device of the class described, the combination with a driving and an associated driven member, of interposed connecting means comprising members having coacting convex and concave spherical faces adapted freely to turn concentrically upon one another, and interconnecting balls associated therewith for rotatably uniting said members, together with plane-faced connecting members and interconnecting balls permitting offset rotatable movement of the parts, substantially as set forth.

2. In a device of the class described, the combination with a driving and an associated driven member including a tool-holder, of interposed connecting means comprising members respectively having convex and concave spherical faces with an interposed ball cage of concavo-convex form, all adapted freely to turn concentrically upon one another, and interconnecting balls associated therewith for rotatably uniting said members, and resilient alining means for said tool-holder positioned opposite the same beyond the connecting means substantially as set forth.

3. In a device of the class described, the combination with a driving and an associated driven member including a tool-holder and its opposing extension, of intermediately interposed connecting means, comprising members respectively having convex and concave faces with an interposed ball cage of concavo-convex form, all adapted freely to turn concentrically upon one another, interconnecting balls associated therewith for rotatably uniting said members, and resilient alining means acting upon the opposing extension of said tool-holder, substantially as set forth.

In testimony whereof I do now affix my signature.

BERNARD P. SCHILTZ.